United States Patent
Belt et al.

(10) Patent No.: US 9,939,651 B1
(45) Date of Patent: Apr. 10, 2018

(54) WAVELENGTH DIVISION MONOLITHIC OPTICAL DEVICE

(71) Applicant: X Development LLC, Mountain View, CA (US)

(72) Inventors: Robert Todd Belt, Sunnyvale, CA (US); Nam-hyong Kim, San Jose, CA (US); Baris Ibrahim Erkmen, Mountain View, CA (US); Edward Allen Keyes, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/664,424

(22) Filed: Jul. 31, 2017

Related U.S. Application Data

(63) Continuation of application No. 14/986,036, filed on Dec. 31, 2015, now Pat. No. 9,720,243.

(51) Int. Cl.
| | |
|---|---|
| *G02B 27/14* | (2006.01) |
| *H04B 10/508* | (2013.01) |
| *H04B 10/572* | (2013.01) |
| *G02B 17/04* | (2006.01) |

(52) U.S. Cl.
CPC ........... *G02B 27/145* (2013.01); *G02B 17/04* (2013.01); *G02B 27/141* (2013.01); *H04B 10/508* (2013.01); *H04B 10/572* (2013.01)

(58) Field of Classification Search
CPC .... G02B 27/145; G02B 17/04; G02B 27/141; H04B 10/508; H04B 10/572
See application file for complete search history.

(56) References Cited

U.S. PATENT DOCUMENTS

| | | | | |
|---|---|---|---|---|
| 4,959,244 A | * | 9/1990 | Penney | C23C 16/52 356/326 |
| 5,659,413 A | | 8/1997 | Carlson | |
| 5,894,122 A | * | 4/1999 | Tomita | B82Y 20/00 250/234 |
| 6,122,051 A | * | 9/2000 | Ansley | G01J 3/02 250/339.05 |
| 6,285,476 B1 | | 9/2001 | Carlson et al. | |
| 7,920,794 B1 | | 4/2011 | Whaley et al. | |
| 8,081,876 B2 | | 12/2011 | Dress et al. | |

(Continued)

*Primary Examiner* — Danny Leung
(74) *Attorney, Agent, or Firm* — Lerner, David, Littenberg, Krumholz & Mentlik, LLP

(57) ABSTRACT

An example beam splitting apparatus is assembled from multiple prisms that are assembled together along respective mating surfaces to form a single monolithic optical device. The beam splitting apparatus includes optical features, such as dichroic and reflective surfaces, that define optical paths for light that enters the beam splitting apparatus. The optical features allow photons in the light to be directed along different optical paths based on their wavelengths. The optical features in the beam splitting apparatus are provided by coatings, films, and/or surface treatments applied to any of the faces of the prisms. In particular, coatings, films, and/or surface treatments are applied to the mating surfaces of the prisms so that the optical features are internal to the assembled monolithic optical device. The beam splitting apparatus may be implemented in a communication terminal that exchanges data modulated light according to frequency-division duplex communications.

20 Claims, 6 Drawing Sheets

(56) References Cited

U.S. PATENT DOCUMENTS

| | | | | |
|---|---|---|---|---|
| 8,170,384 B1* | 5/2012 | Riza | ................ | G02B 6/2861 385/27 |
| 2002/0191176 A1* | 12/2002 | Saleh | ................ | H04B 10/2569 356/73.1 |
| 2003/0058440 A1* | 3/2003 | Scott | ................ | G01J 3/10 356/318 |
| 2006/0290899 A1* | 12/2006 | Davis | ................ | G03B 21/28 353/81 |
| 2009/0268109 A1* | 10/2009 | Schluchter | ................ | G02B 17/023 349/9 |
| 2009/0284150 A1* | 11/2009 | Matsumoto | ................ | H01J 40/06 313/544 |
| 2009/0296200 A1* | 12/2009 | Matsumoto | ................ | B82Y 20/00 359/344 |
| 2010/0014546 A1* | 1/2010 | Matsumoto | ................ | B82Y 20/00 372/25 |
| 2012/0140222 A1* | 6/2012 | Matsumoto | ................ | G01N 21/553 356/338 |
| 2012/0298878 A1* | 11/2012 | Snyder | ................ | H04B 10/70 250/391 |
| 2013/0050707 A1* | 2/2013 | Parks | ................ | G06N 99/002 356/450 |
| 2013/0128714 A1* | 5/2013 | Nakamura | ................ | G11B 7/0065 369/103 |
| 2013/0155723 A1* | 6/2013 | Coleman | ................ | G02B 6/0018 362/621 |
| 2013/0284929 A1* | 10/2013 | Ouchi | ................ | G02F 1/3511 250/339.01 |
| 2014/0133011 A1* | 5/2014 | Schwedt | ................ | G02B 21/0032 359/298 |
| 2014/0294399 A1 | 10/2014 | Makowski et al. | | |
| 2014/0340669 A1* | 11/2014 | Dobschal | ................ | G01S 7/481 356/4.01 |
| 2014/0360578 A1* | 12/2014 | Nichol | ................ | H01L 31/054 136/259 |
| 2015/0233818 A1* | 8/2015 | Manassen | ................ | G01N 21/41 356/369 |
| 2015/0261078 A1* | 9/2015 | Tomiyama | ................ | G03B 21/2033 353/20 |
| 2015/0301338 A1* | 10/2015 | Van Heugten | ................ | G02C 7/04 345/8 |
| 2016/0146722 A1* | 5/2016 | Koerner | ................ | G01N 21/211 356/301 |
| 2016/0233045 A1* | 8/2016 | Hua | ................ | H01J 31/507 |

\* cited by examiner

WAVELENGTH DIVISION MONOLITHIC OPTICAL DEVICE

CROSS-REFERENCE TO RELATED APPLICATION

This application is a continuation application of U.S. patent application Ser. No. 14/986,036, filed Dec. 31, 2015 and issuing as U.S. Pat. No. 9,720,243 on Aug. 1, 2017, which is hereby incorporated by reference in its entirety.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks is growing.

SUMMARY

Free-space optical communications may be employed to provide data connectivity. According to this approach, communication terminals send and receive beams of laser light that are modulated to communicate data. The beams travel through free-space to provide data connectivity over distances between the communication terminals. In some cases, communication terminals may be deployed on ground structures (e.g., building rooftops) where they can exchange data over ground-to-ground (e.g., rooftop-to-rooftop) optical links. In other cases, communication terminals may be deployed on airborne structures (e.g., balloons) to exchange data over air-to-air optical links. In yet other cases, communication terminals may be deployed on airborne structures and ground structures to exchange data over air-to-ground optical links. In further cases, communication terminals may be deployed on ground structures and other structures in outer space to exchange data over ground-to-space optical links.

A communication terminal may employ frequency-division duplex (FDD) communications, where distinct wavelengths of light are used for respective streams of data transmitted to and from the communication terminal. For instance, a first communication terminal may send data according to a first wavelength $\lambda 1$ and receive data according to a second wavelength $\lambda 2$. Correspondingly, a second communication terminal may send data to the first communication terminal according to the second wavelength $\lambda 2$ and receive data from the first communication terminal according to the first wavelength $\lambda 1$.

Multiple wavelengths of light can be transmitted in both directions through a common aperture in a single communication terminal. A single communication terminal may employ a beam splitting apparatus to separate and process the multiple wavelengths passing through the common aperture. For instance, the beam splitting apparatus in a communication terminal can allow an outgoing beam of light having the first wavelength $\lambda 1$ to travel along a first optical path for transmission to another communication terminal. Meanwhile, the beam splitting apparatus may allow an incoming beam of light having the second wavelength $\lambda 2$ to travel along a second optical path for further processing in the communication terminal.

The beam splitting apparatus may be assembled from multiple prisms that are assembled together along respective mating surfaces to form a single monolithic optical device (also referred to as a multi-wavelength optical bus prism). The beam splitting apparatus includes optical features, such as dichroic and reflective surfaces, that define optical paths for beams of light that enter the beam splitting apparatus. The optical features allow photons in the light to be directed along different optical paths based on their wavelengths. The optical features in the beam splitting apparatus are provided by coatings, films, and/or surface treatments applied to any of the faces of the prisms that are joined together.

When the coatings, films, and/or surface treatments are applied to the mating surfaces of the prisms, the optical features are internal to the assembled monolithic optical device. For example, in a monolithic optical device, a surface x of a prism X is joined to a surface y of a prism Y. The surfaces x and y are the mating surfaces for prisms X and Y. If a dichroic film or coating is applied to surface x and/or surface y, a dichroic surface is formed at the interface between the prisms X and Y. The monolithic optical device can be configured to direct a beam of light through the prism X to the dichroic surface. As the beam of light traveling through the prism X meets the dichroic surface, the dichroic surface allows photons having certain wavelengths to pass through the dichroic surface from the prism X to prism Y, while reflecting other photons back into prism X. For instance, if the dichroic film or coating forms a long-pass dichroic surface, photons having wavelengths greater than a threshold wavelength pass through the dichroic surface, while photons having wavelength shorter than the threshold wavelength are reflected. As such, dichroic surfaces can be employed to separate wavelengths of light traveling in the monolithic optical device.

A sequence of particular dichroic surfaces may be employed to provide long pass filtering, where longer wavelengths are successively transmitted through each dichroic surface and the shorter wavelengths are successively reflected off each dichroic surface. The use of long pass filtering in example embodiments provides efficient design for the monolithic optical device and helps to reduce costs of manufacturing.

Furthermore, if the beam traveling through prism X meets the dichroic surface at a non-zero incidence angle, photons reflected from the dichroic surface can be directed in a particular direction. Thus, by selectively shaping the prisms to define angles of incidence for the dichroic surfaces, the dichroic surfaces can also be employed to redirect particular wavelengths of light along particular optical paths. In addition, reflective coatings, films, and/or surface treatments can be applied to any of the faces of the prisms to form reflective surfaces than can be employed to redirect further beams of light within the monolithic optical device.

In general, prisms can be selectively shaped and assembled to form the monolithic optical device that provides desired optical paths for wavelengths of light traveling through the monolithic optical device. The shapes of the prisms and the manner in which the prisms are geometrically assembled allow the dichroic surfaces and reflective surfaces on the faces of the prisms to be positioned at certain locations in the monolithic optical device. The locations of the dichroic surfaces and reflective surfaces define the desired optical paths.

These as well as other aspects, advantages, and alternatives, will become apparent to those of ordinary skill in the art by reading the following detailed description, with reference where appropriate to the accompanying drawings.

DETAILED DESCRIPTION

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

1. Example Optical Communication Systems

Figure 1A:
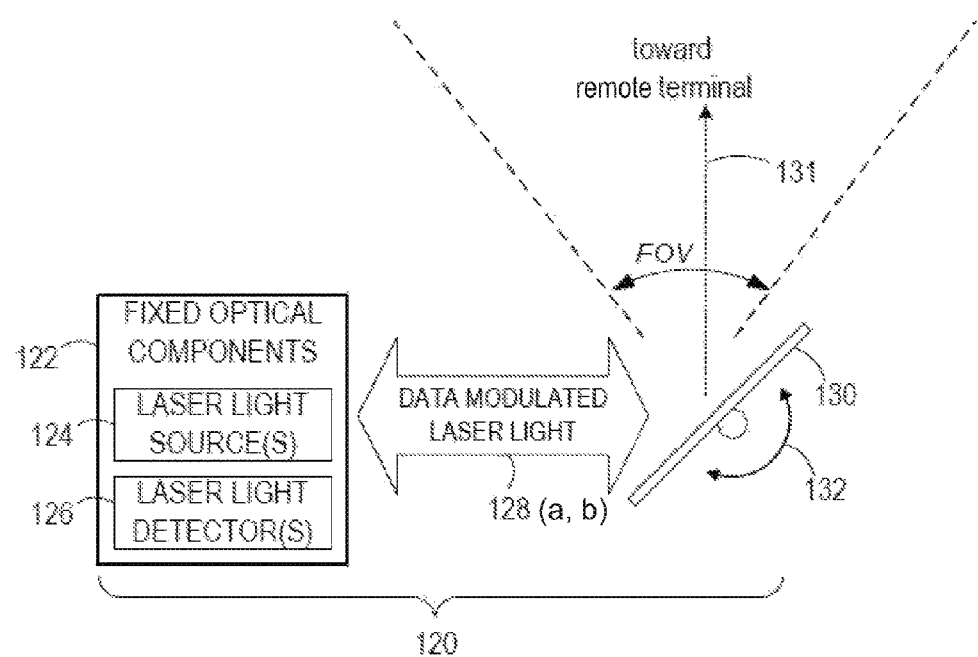
FIG. 1A illustrates an example communication terminal, according to aspects of the present disclosure.

FIG. 1A illustrates an example communication terminal 120. The communication terminal 120 may include a beam-steering mechanism 130 and optical components 122. The beam-steering mechanism 130 can receive an incoming beam of light 128a from a remote (i.e., another) communication terminal and can send an outgoing beam of light 128b to the remote communication terminal. As shown in FIG. 1A, the incoming beam 128a and the outgoing beam 128b generally travel along a path 131 between the beam-steering mechanism 130 and the remote communication terminal. The remote communication terminal modulates the incoming beam 128a to communicate data to the communication terminal 120, and the communication terminal 120 modulates the outgoing beam 128b to communicate data to the remote communication terminal.

The optical components 122 and beam-steering mechanism 130 may be mounted to a frame or other structural feature to substantially fix the relative positions of the optical components 122 and the beam-steering mechanism 130. The beam-steering mechanism 130 can direct the incoming beam 128a from the remote communication terminal to the optical components 122. The optical components 122 may include one or more laser light detectors 126 for detecting the incoming beam 128a.

Additionally, the optical components 122 may include one or more laser light sources 124 for generating the outgoing beam 128b. The beam-steering mechanism 130 can transmit the outgoing beam 128b from the light sources 124 to the remote communication terminal.

The beam-steering mechanism 130 may include a steering mirror with an adjustable orientation that can direct incoming and outgoing beams of light along various directions spanning a field of view (FOV) of the terminal 120. The beam-steering mechanism 130 may be rotatably mounted and may include adjustable mechanical components (e.g., stepper motors, etc.) that cause the reflective surface to rotate with respect to one or more axes of rotation as shown, for instance, by directional arrow 132. Accordingly, the communication terminal 120 can communicate with a remote communication terminal within the field of view.

In addition to the light source(s) 124 and the light detector(s) 126, the communication terminal 120 may also include a variety of optical elements (e.g., lenses, filters, reflectors, fibers, apertures, etc.) arranged to direct light in different directions.

The communication terminal 120 may also include a controller implemented with one or more hardware, software, and/or firmware elements. The controller can demodulate the incoming beam 128a to extract incoming data from the remote communication terminal. The controller can also modulate the outgoing beam 128b according to outgoing data from the communication terminal 120. The controller, for instance, may employ a modem to demodulate the incoming beam 128a and/or to modulate the outgoing beam 128b.

The controller can also adjust the orientation of the beam-steering mechanism 130. As such, the communication terminal 120 may further include feedback sensors that indicate the orientation of the beam-steering mechanism 130.

Figure 1B:
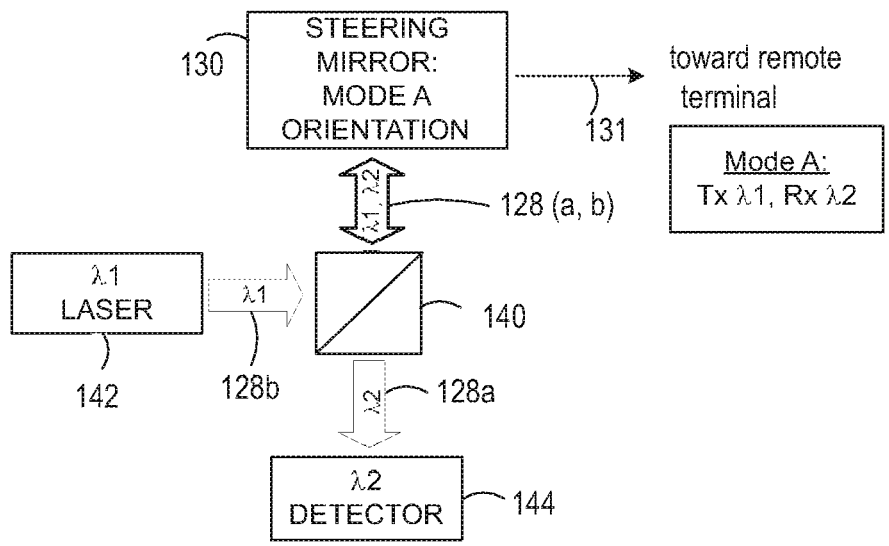
FIG. 1B illustrates an example communication terminal employing FDD communications, according to aspects of the present disclosure.

Example embodiments may employ FDD communications, where distinct wavelengths of light are used for respective streams of data transmitted to and from a single communication terminal. FIG. 1B illustrates the use of FDD communications for the communication terminal 120 according to a first mode A. In mode A, the beam-steering mechanism 130 has a first orientation that allows the beam-steering mechanism 130 to receive the incoming beam 128a from, and send the outgoing beam 128b to, the remote communication terminal along the path 131. The communication terminal 120 receives the incoming beam 128a at a wavelength $\lambda 2$ and sends the outgoing beam 128b at a wavelength $\lambda 1$ The optical components 122 of the communication terminal 120 may include a detector 144 to detect the incoming beam 128a at the wavelength $\lambda 2$, and a laser light source 142 to generate the outgoing beam 128b at the wavelength $\lambda 1$. The optical components 122 also include a beam splitting apparatus 140, which substantially transmits light with wavelength $\lambda 2$ along one optical path and substantially reflects light with wavelength $\lambda 1$ along another optical path. The beam splitting apparatus 140 thus provides wavelength-dependent optical paths through the communication terminal 120 and can separate the outgoing beam 128b with the wavelength $\lambda 1$ from the incoming beam 128a with the wavelength $\lambda 2$. The incoming beam 128a can travel along a first optical path from the beam splitting apparatus 140 to the detector 144. The outgoing beam 128b can travel along a second optical path from the light source 142 to the beam splitting apparatus 140, where the second optical path is different from the first optical path. Correspondingly, the light source 142 and the detector 144 can be located at distinct locations. The incoming beam 128a and the outgoing beam 128b, however, may travel along a common optical path between the beam splitting apparatus 140 and the beam-steering mechanism 130.

Figure 1C:
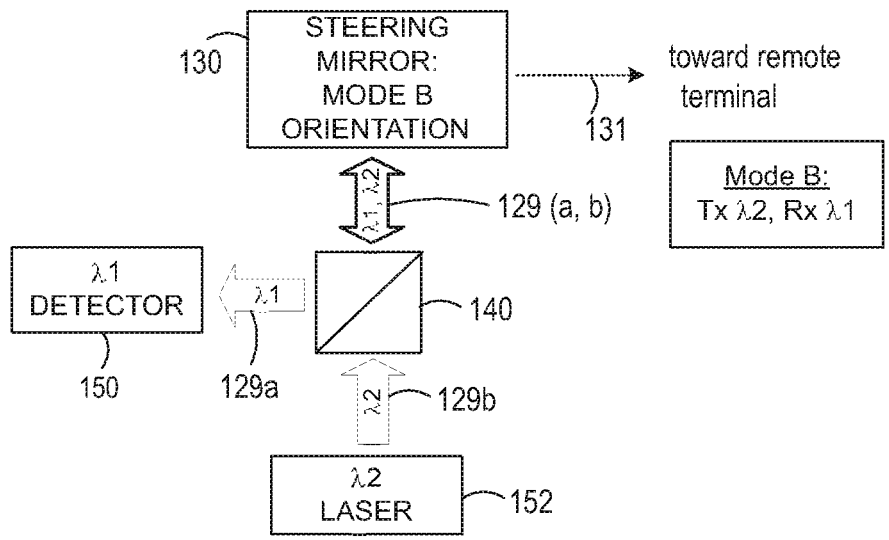
FIG. 1C illustrates another example communication terminal employing another mode of FDD communications, according to aspects of the present disclosure.

FIG. 1C further illustrates the use of FDD communications for the communication terminal 120 according to a second mode B. In mode B, the beam-steering mechanism 130 has a second orientation that allows the beam-steering mechanism 130 to receive an incoming beam of light 129a from, and send an outgoing beam of light 129b to, the remote communication terminal along the path 131. The communication terminal 120 receives the incoming beam 129a at the wavelength λ1 and sends the outgoing light at the wavelength λ2.

The optical components 122 of the communication terminal 120 may also include a detector 150 to detect the incoming beam 129a at the wavelength λ1, and a laser light source 152 to generate the outgoing beam 129b at the wavelength λ2. As described above, the beam splitting apparatus 140 substantially transmits light with wavelength λ2 along one optical path and substantially reflects light with wavelength λ1 along another optical path. As such, the beam splitting apparatus 140 can separate the incoming beam 129a with the wavelength λ1 from the outgoing beam 129b with the wavelength λ2. The incoming beam 129a can travel along a third optical path from the beam splitting apparatus 140 to the detector 150. The outgoing beam 129b can travel along a fourth optical path from the light source 152 to the beam splitting apparatus 140, where the fourth optical path is different from the third optical path. The incoming beam 129a and the outgoing beam 129b, however, may travel along a common optical path between the beam splitting apparatus 140 and the beam-steering mechanism 130.

The communication terminal 120 can selectively operate in mode A as shown in FIG. 1B or in mode B as shown in FIG. 1C. In particular, the communication terminal 120 can switch between the modes A and B by moving the beam-steering mechanism 130 between the first orientation and the second orientation, respectively.

In mode A, the beam-steering mechanism 130 is aligned to direct the incoming beam 128a from the remote communication terminal to the detector 144 via the beam splitting apparatus 140. In addition, the beam-steering mechanism 130 is aligned to direct the outgoing beam 128b from the light source 142 to the remote communication terminal via the beam splitting apparatus 140.

In mode B, the beam-steering mechanism 130 is aligned to direct the incoming beam 129a from the remote communication terminal to the detector 150 via the beam splitting apparatus 140. In addition, the beam-steering mechanism 130 is aligned to direct the outgoing beam 129b from the light source 152 to the remote communication terminal via the beam splitting apparatus 140.

Accordingly, the light source 142 for mode A and the light source 152 for mode B are located so that the optical path for the outgoing beam 128b and the optical path for the outgoing beam 129b define an angular separation that corresponds to the difference between the first orientation (mode A) and the second orientation (mode B) for the beam-steering mechanism 130. Similarly, the detector 144 for mode A and the detector 150 for mode B are located so that the optical path for the incoming beam 128a and the optical path for the incoming beam 129a define an angular separation that corresponds to the difference between the first orientation and the second orientation for the beam-steering mechanism 130.

Thus, the communication terminal 120 can switch between modes A and B by adjusting the orientation of the beam-steering mechanism 130 and activating the respective light source 142, 152 and the respective detector 144, 150. Advantageously, the terminal 120 can be dynamically reconfigured to switch modes for FDD communications solely by moving the beam-steering mechanism 130 while keeping the other optical components in the communication terminal 120 fixed.

Generally, to communicate with a remote communication terminal in any direction within the field of view, the terminal 120 may be configured to orient the mirror through a range of angles. For a given path for free-space optical communications, there may be two different possible orientations for the beam-steering mechanism 130: one aligned with a light source for light with wavelength λ1 and a detector for light with wavelength λ2 (e.g., for mode A); and another aligned with a light source for light with wavelength λ2 and a detector for light with wavelength λ1 (e.g., for mode B). Thus, the controller for the communication terminal 120 can determine an orientation of the beam-steering mechanism 130 according to the position of the remote communication terminal and the desired mode for FDD communications.

Figure 2:
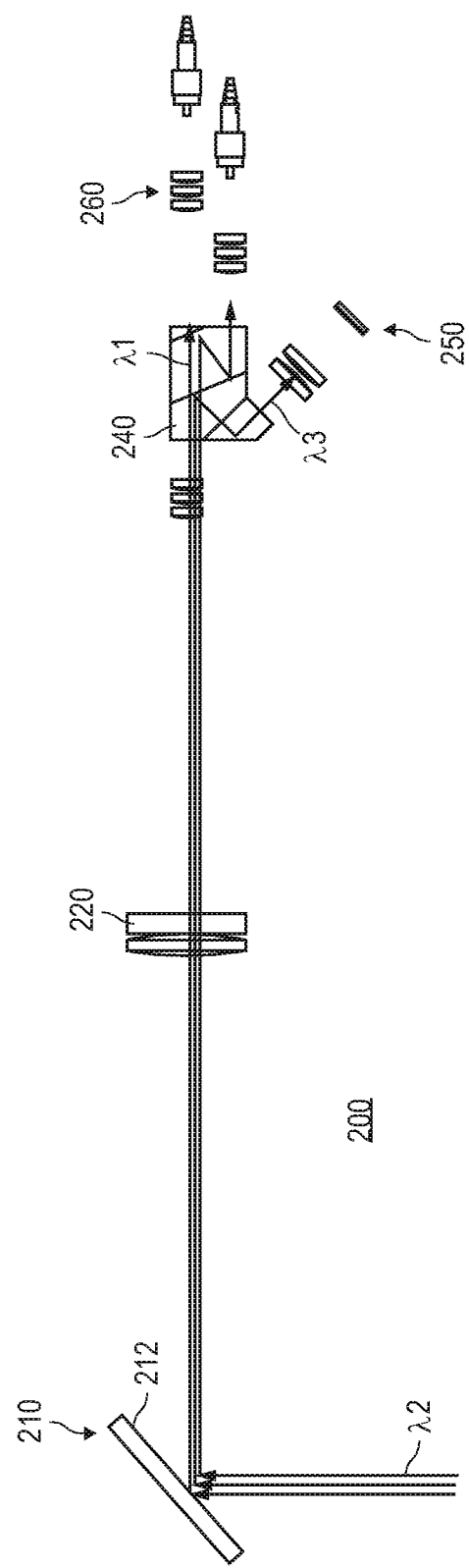
FIG. 2 illustrates an example arrangement of components of a communication terminal, according to aspects of the present disclosure.

FIG. 2 is a diagram of an example communication terminal 200. The communication terminal 200 includes a beam-steering mechanism 210, beam expander 220, a beam splitting apparatus 240, and fiber-coupling optics 260.

The communication terminal 200 is configured to conduct FDD communications with remote communication terminals. In particular, the communication terminals communicate by sending and receiving beams of data-modulated light. As shown in FIG. 2, the beam steering mechanism 210, the beam expander 220, and the beam splitting apparatus 240 are aligned, so that the incoming and outgoing beams travel along a common optical axis.

The beam-steering mechanism 210 includes a steering mirror 212 which can be rotated about one or more axes to adjust an orientation for transmitting incoming and outgoing beams. The beam steering mechanism 210 may also include hardware components for mounting the beam steering mechanism 210. The beam-steering mechanism 210 may be mounted to a rail or other mounting structure in order to secure the beam steering mechanism 210 relative to the beam expander 220 and other components of the communication terminal 200.

The beam expander 220 may include one or more lenses and/or mirrors to focus the incoming beam into a narrow collimated beam that is directed toward the beam splitting apparatus 240. The beam splitting apparatus 240 includes optical features, such as dichroic surfaces and reflective surfaces, that cause photons of different wavelengths in the incoming beam to be directed in different respective directions.

In example embodiments, data may be transmitted as modulated laser light having wavelengths λ1 or λ2. In some cases, for instance, the wavelength λ1 may be approximately 1565 nm, and the wavelength λ2 may be approximately 1550 nm. As described above, the communication terminal 200 can be selectively configured to receive incoming light at the wavelength λ2 and send outgoing light at the wavelength λ1 during mode A communication, or to receive incoming light at the wavelength λ1 and send outgoing light at the wavelength λ2 during mode B communication. The beam splitting apparatus 240 can direct photons having the wavelength λ1 in the incoming beam along one optical path and photons having the wavelength λ2 in the incoming beam along another optical path.

Conversely, light of different wavelengths from respective light sources may pass into the beam splitting apparatus 240 via the fiber-coupling optics 260. In particular, light at the wavelength λ1 may pass into the beam splitting apparatus 240 from one light source, and light at the wavelength λ2 may pass into the beam splitting apparatus 240 from another light source. The beam splitting apparatus 240 produces an outgoing beam that can include the different wavelengths of light and directs the outgoing beam along a common optical path to the beam expander 220. The beam expander 220 expands the outgoing beam and the beam-steering mechanism 210 directs the outgoing beam to a remote communication terminal.

The fiber-coupling optics 260 may include a fiber optic cable for transmitting different wavelengths of light to or from the beam splitting apparatus 240. For example, the fiber-coupling optics 260 can transmit the light of different wavelengths from an incoming beam to respective components (e.g., detectors) for further processing as described above. The fiber-coupling optics 260 may also include a set of optical components (e.g., lenses, filters, etc.) for focusing, collimating, and/or filtering the light transmitted to or from the beam splitting apparatus 240.

The remote communication terminal may include a beacon emitter, which emits a beacon light beam that can be used by the communication terminal 200 to align itself and establish communications with the remote communication terminal. The beacon emitter, for instance, may emit the beacon light beam at a wavelength λ3 (e.g., 850 nm) that is different from the wavelengths λ1 and λ2 used to communicate data as described above (e.g., 1565 nm and 1550 nm).

As shown in FIG. 2, the communication terminal 200 includes a beacon sensor 250 that can detect an incoming beacon light beam from the remote communication terminal. The communication terminal 200 can use this incoming beacon light beam to align itself and establish communications with the remote communication terminal. The incoming beacon light beam has the wavelength λ3. The incoming beacon light beam is also received by the beam-steering mechanism 210 and directed through the beam expander 220 and the beam splitter apparatus 240. Just as the beam splitter apparatus 240 can direct photons having the wavelengths λ1 and λ2 along different respective optical paths, the beam splitter 240 directs the incoming beacon light beam having wavelength λ3 separately to the beacon sensor 250. As described above, the beam splitting apparatus 240 includes optical features, such as dichroic surfaces and reflective surfaces, that cause different wavelengths of light to be directed along different respective optical paths.

The beacon sensor 250 may include an image sensor that allows the incoming beacon light beam to be imaged onto a pixelated light-sensitive array. In particular, specific coordinates on the pixelated array are exposed to an image corresponding to the beacon light beam, and these image coordinates indicate the orientation of the incoming beacon light beam relative to the steering mirror 212. The image coordinates can then be used as feedback to adjust the steering mirror 212 to achieve a more optimal orientation between the communication terminal 200 and the remote communication terminal sending the incoming beacon light beam. For example, the image coordinates may be used to adjust the steering mirror 212 until the image coordinates coincide sufficiently with target coordinates, which are determined from a calibration procedure.

The beacon sensor 250 can be mounted to the communication terminal 200 to fix its respective position relative to other components of the communication terminal 200. For example, the beam splitting apparatus 240, the beacon sensor 250, and the fiber-coupling optics 260 can be mounted to a common mounting plate. The mounting plate may be, for example, a rigid substrate constructed of a material with a relatively low degree of thermal expansion that is configured to receive fasteners (e.g., screws or the like) that can be used to rigidly attach other optical components thereto. In some cases, the mounting plate may be similar to an optical rail so as to provide a substantially fixed alignment between different components, such as the beam splitting apparatus 240 and the beacon sensor 250.

According to an example operation of the communication terminal 200 shown in FIG. 2:

(1) The beam-steering mechanism 210 is roughly aligned with the remote communication terminal to establish an optical link.

(2) The beam-steering mechanism 210 receives an incoming beacon light beam with the wavelength λ3 from the remote communication terminal.

(3) The incoming beacon light beam passes through and is reduced by the beam expander 220.

(4) The beam splitting apparatus 240 directs the incoming beacon light beam along a wavelength-dependent path (i.e., depending on the wavelength λ3) through the beam splitting apparatus 240.

(5) The incoming beacon light beam impinges on the beacon sensor 250.

(6) The information provided by the beacon light beam is used, e.g., in a servo loop, to control the beam steering mechanism 210.

(7) An outgoing data-modulated light beam having the wavelength λ2 travels from a light source via a respective one of the fiber-coupling optics 260.

(8) The beam splitting apparatus 240 directs the outgoing data-modulated light beam along a wavelength-dependent path (depending on the wavelength λ2) through the beam splitting apparatus 240.

(9) The outgoing data-modulated light beam passes through and is expanded by the beam expander 220.

(10) The beam steering mechanism 210 directs the outgoing data modulated light to the remote communication terminal.

(11) The beam steering mechanism 210 receives an incoming data-modulated light beam having the wavelength λ1 from the remote communication terminal.

(12) The incoming data-modulated light beam passes through and is reduced by the beam expander 220.

(13) The beam splitting apparatus 240 directs the incoming data-modulated light beam along a wavelength-dependent path (depending on the wavelength λ1) through the beam splitting apparatus 240.

(14) The incoming data-modulated light beam passes into a respective one of the fiber-coupling optics 260 to a detector for further processing, e.g., demodulation.

Accordingly, FIG. 2 shows the communication terminal 200 operating in mode B described above, where the outgoing data-modulated light beam has the wavelength λ2 and the incoming data-modulated light beam has the wavelength λ1. In this case, the incoming beams have the wavelengths λ1 and λ3, while the outgoing beam has the wavelength λ2.

Alternatively, the communication terminal 200 can operate in mode A described above, where the outgoing data-modulated light beam has the wavelength λ1 and the incoming data-modulated light beam has the wavelength λ2. In this case, the incoming beams have the wavelengths λ2 and λ3, while the outgoing beam has the wavelength λ1. The beam splitting apparatus 240 directs the incoming data-modulated beam having the wavelength λ2 along one optical path and the incoming beacon light beam having the wavelength λ1 along a separate optical path.

2. Example Beam Splitting Apparatus

As described above, the communication terminal 200 includes a beam splitting apparatus 240. The beam splitting apparatus 240 can handle the wavelengths exchanged during FDD communications. For example, the communication terminal 200 can receive an incoming laser light beam from another communication terminal, and the beam splitting apparatus 240 can separate the wavelengths (e.g., λ2 and λ3 in mode A, λ1 and λ3 in mode B) of light that may be included in incoming light beams. With the beam splitting apparatus 240, the communication terminal 200 can handle different communication modes where the incoming laser light beams include different respective wavelengths of light (e.g., λ2 in mode A, λ1 in mode B).

In example embodiments, the beam splitting apparatus is assembled from multiple prisms that are assembled together along respective mating surfaces to form a single monolithic optical device (also referred to as a multi-wavelength optical bus prism). The beam splitting apparatus includes optical features, such as dichroic and reflective surfaces, that define optical paths for light that enters the beam splitting apparatus. The optical features allow photons in the light to be directed along different optical paths based on their wavelengths. The optical features in the beam splitting apparatus are provided by coatings, films, and/or surface treatments applied to any of the faces of the prisms that are joined together.

When the coatings, films, and/or surface treatments are applied to the mating surfaces of the prisms, the optical features are internal to the assembled monolithic optical device. For example, in a monolithic optical device, a surface x of a prism X is joined to a surface y of a prism Y (i.e., the surfaces x and y are the mating surfaces for prisms X and Y). If a dichroic film or coating is applied to surface x and/or surface y, a dichroic surface is formed at the interface between the prisms X and Y. The monolithic optical device can be configured to direct a beam of light through the prism X to the dichroic surface. As the beam of light traveling through the prism X meets the dichroic surface, the dichroic surface allows photons having certain wavelengths to pass through the dichroic surface from the prism X to prism Y, while reflecting other photons back into prism X. For instance, if the dichroic film or coating forms a long-pass dichroic surface, photons having wavelengths greater than a threshold wavelength pass through the dichroic surface, while photons having wavelength shorter than the threshold wavelength are reflected. As such, dichroic surfaces can be employed to separate wavelengths of light traveling in the monolithic optical device.

Furthermore, if the beam traveling through prism X meets the dichroic surface at a non-zero incidence angle, photons reflected from the dichroic surface can be directed in a particular direction. Thus, by selectively shaping the prisms to define angles of incidence for the dichroic surfaces, the dichroic surfaces can also be employed to redirect particular wavelengths of light along particular optical paths. In addition, reflective coatings, films, and/or surface treatments can be applied to any of the faces of the prisms to form reflective surfaces than can be employed to redirect further beams of light within the monolithic optical device.

In general, prisms can be selectively shaped and assembled to form the monolithic optical device that provides desired optical paths for wavelengths of light traveling through the monolithic optical device. The shapes of the prisms and the manner in which the prisms are geometrically assembled allow the dichroic surfaces and reflective surfaces on the faces of the prisms to be positioned at certain locations in the monolithic optical device. The locations of the dichroic surfaces and reflective surfaces define the desired optical paths.

In contrast to complex systems in which optical features are provided by separate components (e.g., lenses, mirrors, etc.) that must be carefully arranged and fixed to mounting structures, the monolithic optical device requires less space and can be manufactured more easily and more cost effectively. In addition, unlike the complex arrangement of separately mounted components, the monolithic optical device is less susceptible to unwanted shifts in the relative positions of the precisely aligned optical features. Thus, the monolithic optical device can provide more robust performance in different operational conditions. Other advantages of the monolithic optical device are described further below.

Figure 3A:
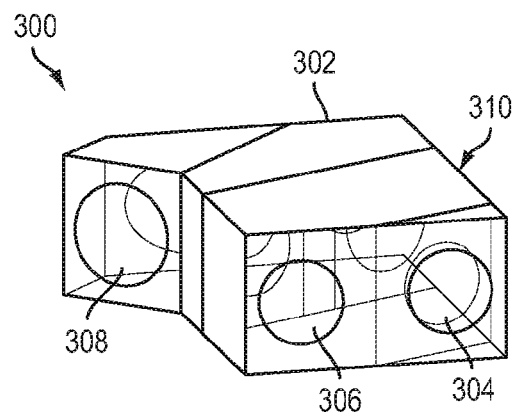
FIG. 3A illustrates an aspect view of an example beam splitting apparatus configured as a monolithic optical device, according to aspects of the present disclosure.
Figure 3B:
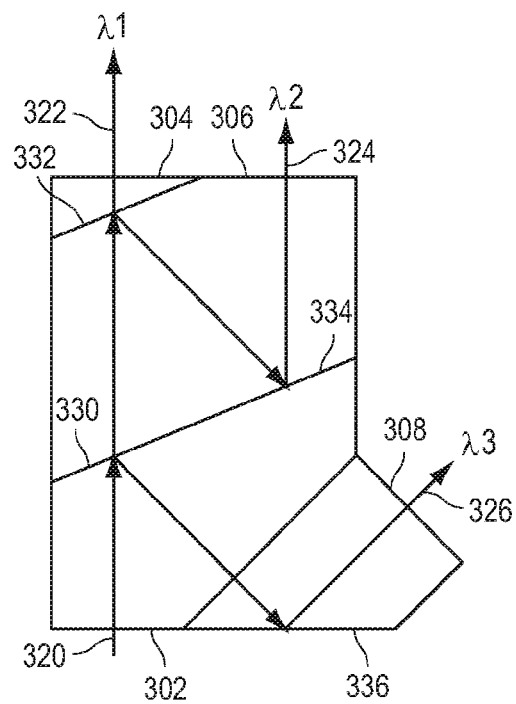
FIG. 3B illustrates a top view of the example beam splitting apparatus shown in FIG. 3A.
Figure 3C:
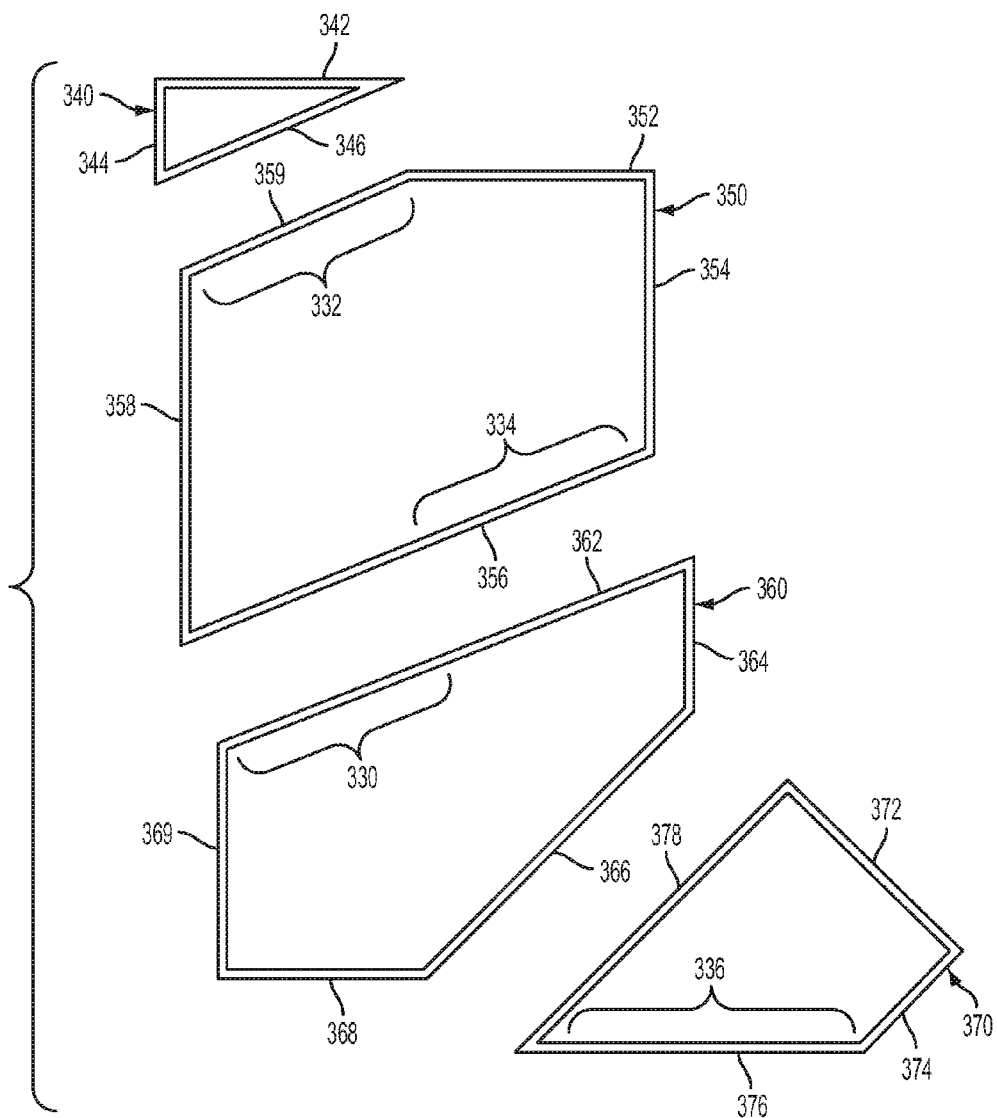
FIG. 3C illustrates a disassembled view of the example beam splitting apparatus shown in FIG. 3A.

FIG. 3A is an aspect view of an example beam splitting apparatus 300 that is configured as a monolithic optical device. FIG. 3B is a top view of the example beam splitting apparatus 300. FIG. 3C is a disassembled view of the example beam splitting apparatus 300.

2a) Apparatus Geometry

As shown in FIG. 3A, the beam splitting apparatus 300 includes a first window 302, a second window 304, a third window 306, and a fourth window 308. The windows 302, 304, 306, 308 are arranged along respective exterior surfaces of the apparatus 300.

As FIG. 3B illustrates, an incoming beam 320 passes through the first window 302. If, for example, the beam splitting apparatus 300 is implemented in the communication terminal 200 of FIG. 2, the incoming beam 320 originates at a remote communication terminal and is directed to the beam splitting apparatus 300 via the beam-steering mechanism 210 and the beam expander 220.

As described above, example systems may operate according to different modes of FDD communications at a given instant. When the communication terminal 200 operates in mode A, the incoming beam 320 includes light having the wavelength λ2. On the other hand, when the communication terminal 200 operates in mode B, the incoming beam 320 includes light having the wavelength λ1. Furthermore, as also described above, example systems may receive a beacon light beam having the wavelength λ3 in either mode A or B.

Once the incoming beam 320 passes through the first window 302, dichroic and reflective surfaces selectively direct photons of particular wavelengths along respective optical paths within the beam splitting apparatus 300. These optical paths cause light of particular wavelengths to exit the beam splitting apparatus 300 through the windows 304, 306, 308, respectively. Specifically, photons having the wavelength λ1 exit the beam splitting apparatus 300 through the second window 304 as a λ1 beam 322. Photons having the wavelength λ2 exit the beam splitting apparatus 300 through the third window 306 as a λ2 beam 324. Photons having the wavelength λ3 exit the beam splitting apparatus 300 through the fourth window 308 as a λ3 beam 326.

As shown with the λ1 beam 322 and the λ2 beam 324 in FIG. 3B, the beam splitting apparatus 300 provides rectilinear optical axes with respect to the incoming beam 320. This simplifies opto-mechanical implementation of the beam splitting apparatus 300 and allows the beam splitting apparatus 300 to operate more robustly over a wide temperature range, for example.

Conversely, the light of particular wavelengths can respectively pass through the windows 304 and 306 in the opposite direction and into the beam splitting apparatus 300. Specifically, light having the wavelength λ1 can enter the beam splitting apparatus 300 through the second window 304. Light having the wavelength λ2 can enter the beam splitting apparatus 300 through the third window 306. The light passing through the windows 304 and 306 are directed by the dichroic and reflective surfaces along the respective optical paths to exit the beam splitting apparatus 300 through the first window 302 as an outgoing beam with the particular wavelengths.

If the beam splitting apparatus 300 is implemented in the communication terminal 200 of FIG. 2, for example, the outgoing beam exiting the beam splitting apparatus passes through the beam expander 220 and to the beam-steering mechanism 210. Operating according to different modes, the outgoing beam in mode A includes the wavelength λ2. Meanwhile, in mode B, the outgoing beam includes the wavelength λ1.

2b) Dichroic and Reflective Surfaces

As shown in FIG. 3B, the beam splitting apparatus 300 includes a first dichroic surface 330 and a second dichroic surface 332. Each dichroic surface 330, 332 allows photons of certain wavelengths to pass through the surface while causing other photons to reflect off the surface. In addition, the beam splitting apparatus 300 includes a first reflective surface 334 and a second reflective surface 336, which redirect certain photons within the beam splitting apparatus 300. The dichroic surfaces 330, 332 and the reflective surfaces 334, 336 may be formed by a variety of different films, coatings, and/or surface treatments.

The incoming beam 320 passing through the first window 302 may have the wavelengths λ2 and/or the wavelength λ3 in mode A, or alternatively, the wavelengths λ1 and/or the wavelength λ3 in mode B. For instance, the wavelength λ1 may be approximately 1565 nm, the wavelength λ2 may be approximately 1550 nm, and the wavelength λ3 may be approximately 850 nm. With these particular wavelengths, a 1000 nm long-pass dichroic coating (LPDC) may be employed at the first dichroic surface 330. As FIG. 3B illustrates, the first dichroic surface 330 thus allows photons with wavelengths greater than 1000 nm to pass through the first dichroic surface 330 while causing photons with wavelengths less than 1000 nm to reflect off the first dichroic surface 330. In particular, photons with wavelength λ1 (1565 nm) and wavelength λ2 (1550 nm) pass through the first dichroic surface 330, and photons with the beacon wavelength λ3 (850 nm) reflect off the first dichroic surface 330.

After reflecting off the first dichroic surface 330, photons with the wavelength λ3 travel through the beam splitting apparatus 300 until they reflect off the second reflective surface 336. The second reflective surface 336 directs the photons with the wavelength λ3 to the fourth window 308 where the photons exit the beam splitting apparatus 300 as the λ3 beam 326. The fourth window 308 may be coated with an anti-reflective coating to prevent the photons from reflecting internally back into the beam splitting apparatus 300.

A 1558 nm LPDC may be employed at the second dichroic surface 332. The second dichroic surface 330 thus allows photons with wavelengths greater than 1558 nm to pass through the second dichroic surface 332 while causing photons with wavelengths less than 1558 nm to reflect off the second dichroic surface 332. In particular, photons with the wavelength λ1 (1565 nm) pass through the second dichroic surface 332, and photons with the wavelength λ2 (1550 nm) reflect off the second dichroic surface 332.

After passing through the second dichroic surface 332, the photons with wavelength λ1 travel to the second window 304 where the photons exit the beam splitting apparatus 300 as the λ1 beam 322. The second window 304 may be coated with an anti-reflective coating to prevent the photons from reflecting internally back into the beam splitting apparatus 300.

After reflecting off the second dichroic surface 332, photons with the wavelength λ2 travel through the beam splitting apparatus 300 until they reflect off the first reflective surface 334. The first reflective surface 334 directs the photons with the wavelength λ2 to the third window 306 where the photons exit the beam splitting apparatus 300 as the λ2 beam 324. The third window 306 may be coated with an anti-reflective coating to prevent the photons from reflecting internally back into the beam splitting apparatus 300.

The first dichroic surface 330 and the second dichroic surface 332 in this example embodiment are configured to employ long pass filtering, where longer wavelengths are successively transmitted through each dichroic surface and the shorter wavelengths are successively reflected off each dichroic surface. The use of long pass filtering provides efficient design for the beam splitting apparatus 300 and helps to reduce costs of manufacturing.

If the beam splitting apparatus 300 is implemented in the communication terminal 200 of FIG. 2, for example, the λ1 and λ2 beams are directed to respective fiber-coupling optics 360 and the λ3 beam 326 is directed to the beacon sensor 350. As FIG. 3B illustrates, the dichroic surfaces 330, 332 and the reflective surfaces 334, 336 are configured to create an even number (0, 2, 4, . . . ) of reflections in the beam splitting apparatus 300 for each of the λ1, λ2, and λ3 beams. This minimizes the impact of any post-assembly misalignment when the beam splitting apparatus 300 is integrated into an optical path, e.g., of the communication terminal 200. The reliability of the beam splitting apparatus 300 is therefore enhanced and the costs of supporting use of the beam splitting apparatus 300 can be reduced.

Although FIG. 3B illustrates the incoming beam 320 entering the beam splitting apparatus 300, light with the wavelengths λ1 and λ2 can conversely pass through the windows 304 and 306, respectively, and into the beam splitting apparatus 300. The light with wavelength λ1 passes through the second dichroic surface 332 and the first dichroic surface 330 and exits the beam splitting apparatus 300 through the first window 302 as an outgoing beam. The light with the wavelength λ2 reflects off the first reflective surface 334 and the second dichroic surface 332 and passes through the first dichroic surface 330. The light with the wavelength λ2 also exits the beam splitting apparatus 300 through the first window 302 as a similar outgoing beam. An anti-reflective coating can be applied to the first window 302 to help prevent any internal reflections back into the beam splitting apparatus 300.

2c) Materials and Assembly

As shown in FIG. 3C, the body 310 of the beam splitting apparatus 300 is formed from a combination of a first prism 340, a second prism 350, a third prism 360, and a fourth prism 370. The four specially shaped prisms 340, 350, 360, 370 are initially separate pieces but joined together during assembly to form a monolithic optical device. FIG. 3C shows the four prisms 340, 350, 360, and 370 from a top view, and the reference numerals shown in FIG. 3C identify surfaces/faces that are perpendicular to the plane of the page.

The four prisms 340, 350, 360, and 370 may be formed of glass having a relatively low degree of thermal expansion, such as an aluminosilicate glass or a borosilicate glass (e.g., Schott BK7). Alternatively, ceramic materials and/or crystal materials may also be used.

If made from glass, the four prisms 340, 350, 360, and 370 combine to create optical paths in the beam splitting apparatus 300 that occur within glass. The glass provides a homogeneous solid medium that allows quality of beams transmitted through, and reflected from, surfaces to be controlled to a high degree of accuracy. The use of glass prisms allows the overall size of the beam splitting apparatus 300 to be compressed. In addition, critical surfaces are protected from contamination. Furthermore, the use of glass prisms eliminates the need for mechanical supports, which add weight, cost, and introduce sources for misalignment.

The glass may be sawed and polished to produce the shapes of the individual prisms, and then those shapes can be joined along respective mating faces using adhesion bonding, such as using sealants and epoxies, soldering and/or fritting.

Alternatively, the four prisms 340, 350, 360, and 370 may be joined together via optical contact bonding in which the two mating faces are held together purely by intermolecular forces (e.g., covalent and Van der Waals forces). Optical contact bonding requires very clean, conformal mating surfaces between the pieces, but may allow for greater precision in surface finishes.

As shown in FIG. 3C, the prisms 340, 350, 360, and 370 can be selectively shaped with any number and configuration of faces. In particular, the first prism 340 includes three faces 342, 344, and 346 that define a triangular profile. As shown, the face 342 is substantially perpendicular to the face 344 and intersects the face 346 at an angle of approximately 22.5 degrees. The face 342 includes the second window 304 through which light having the wavelength $\lambda 1$ exits or enters the beam splitting apparatus 300. The face 346 is a mating surface that is joined to the second prism 350 during assembly.

The second prism 350 includes five faces 352, 354, 356, 358, and 359. The faces 354 and 358 are substantially parallel to each other. Extending from the face 354 to the face 358, the face 356 intersects the face 354 at an angle of approximately 112.5 degrees and intersects the face 358 at an angle of approximately 67.5 degrees. The face 356 is a mating surface that is joined to the third prism 360 during assembly. The face 352 is substantially perpendicular to the face 354. The face 352 includes the third window 306 through which light with wavelength $\lambda 2$ exits or enters the beam splitting apparatus 300. Extending from the face 352 to the face 358, the face 359 is substantially parallel to the face 356. The face 359 intersects the face 352 at an angle of approximately 157.5 degrees and intersects the face 358 at an angle of approximately 112.5 degrees. The face 359 is a mating surface that is joined to the corresponding face 346 of the first prism 340 during assembly.

The third prism 360 includes five faces 362, 364, 366, 368, and 369. The face 364 is substantially parallel to the face 369. The distance between the faces 364 and 369 are substantially equal to the distance between the faces 354 and 358 of the second prism 350. The face 364 intersects the face 362 at an angle of approximately 67.5 degrees. The face 369 intersects the face 362 at an angle of approximately 112.5 degrees. The face 362 is a mating surface that is joined to the corresponding face 356 of the second prism 350. The face 368 is substantially perpendicular to the face 368. The face 368 includes the first window 302 through which the incoming or outgoing beams (including wavelengths $\lambda 1, \lambda 2,$ or $\lambda 3$) enter or exit the beam splitting apparatus 300. Extending between the faces 364 and 368, face 366 intersects both the face 368 and the face 364 at an angle of approximately 135 degrees. The face 366 is a mating surface that is joined to the fourth prism 370 during assembly.

The fourth prism 370 includes four faces 372, 374, 376, and 378. The face 374 is substantially parallel to the face 378. Extending between the faces 374 and 378, the face 372 is substantially perpendicular to both the face 374 and the face 378. The face 378 is a mating surface that is joined to the corresponding face 366 of the third prism 360 during assembly. The face 372 includes the fourth window 308 through which light with the wavelength $\lambda 3$ exits the beam splitting apparatus 300. Extending between the faces 374 and 378, the face 376 intersects the side face 374 at an angle of approximately 135 degrees and intersects the face 378 at an angle of approximately 45 degrees.

Prior to assembly, a dichroic coating or film is applied to the face 362 of the third prism 360 and/or the face 356 of the second prism 350. Thus, when the face 362 is joined to the corresponding face 356 during assembly, the first dichroic surface 330 is defined along the interface defined by the faces 362 and 356. In particular, the first dichroic surface 330 is aligned with the first window 302, so that an incoming beam entering through the first window 302 is intercepted by the first dichroic surface 330. Conversely, any light passing through the first dichroic surface 330 in the opposite direction passes through the first window 302 as the outgoing beam.

As described above, the first dichroic surface 330 allows light having the wavelengths $\lambda 1$ and $\lambda 2$ to pass through the surface, but causes light having the wavelength $\lambda 3$ to be reflected away from the first dichroic surface 330. For instance, the first dichroic surface 330 may include a 1000 nm long-pass dichroic coating that allows the wavelengths $\lambda 1$ and $\lambda 2$ of 1565 nm and 1550 nm, respectively, to pass through the surface, but that causes the first dichroic surface 330 to reflect the wavelength $\lambda 3$ of 850 nm.

Prior to assembly, a different dichroic coating or film is applied to the face 359 of the second prism 350 and/or the face 346 of the first prism 340. Thus, when the face 359 is joined to the corresponding face 346 during assembly, the second dichroic surface 332 is defined along the interface defined by the faces 359 and 346. As described above, the dichroic coating or film at this interface allows light having the wavelength $\lambda 1$ to pass through the interface, but causes light having the wavelength $\lambda 2$ to be reflected away from the interface. For instance, the second dichroic surface 332 may include a 1558 nm long-pass dichroic surface that allows a wavelength $\lambda 1$ of 1565 nm to pass through the surface, but that causes the second dichroic surface 332 to reflect a wavelength $\lambda 2$ of 1550 nm. The use of dichroic coatings or films for wavelength separation makes the beam splitting apparatus 300 easier and less costly to fabricate.

When reflected by the second dichroic surface 332, the light having the wavelength $\lambda 2$ is directed to the face 356 at an incidence angle of approximately 22.5 degrees. To redirect the light having the wavelength $\lambda 2$ to the third window 306, a reflective coating, film, and/or surface treatment is applied to the face 356 to form the reflective surface 334. As shown in FIG. 3C, the reflective surface 334 and the first dichroic surface 330 are disposed along different areas of the interface defined by the faces 356 and 362.

Due to the orientation of the first dichroic surface 330 relative to the first window 302, the incoming beam is incident on the first dichroic surface 330 at an angle of approximately 22.5 degrees. Advantageously, this small incidence angle (e.g., in contrast to 45 degrees) enables more efficient separation of the wavelengths λ1 and λ2 from the wavelength λ3 at the first dichroic surface 330, because there is less crosstalk and higher emissivity. When reflected by the first dichroic surface 330, the light having the wavelength λ3 is directed to the face 376 at an incidence angle of approximately 45 degrees. A reflective coating, film, and/or surface treatment is applied to the face 376 to form the reflective surface 336, which receives the light having the wavelength λ3 and redirects it to the fourth window 308.

Anti-reflective coatings may be applied to the windows 302, 304, 306, and 308 to help prevent any internal reflections back into the beam splitting apparatus 300.

Upon assembly, the monolithic optical device has a length defined by the combination of faces 369, 358, and 344. In some embodiments, this length may be approximately 4 cm to 6 cm, although the precise size and scaling may be adjusted depending on a variety of factors.

3. Alternative Apparatus Geometry

Examples of alternative beam splitting apparatuses are described below in connection with FIGS. 4 and 5. Like the beam splitting apparatus 300, these alternative beam splitting apparatuses are configured as monolithic optical devices and can be implemented with the communication terminal 200 for example.

Figure 4:
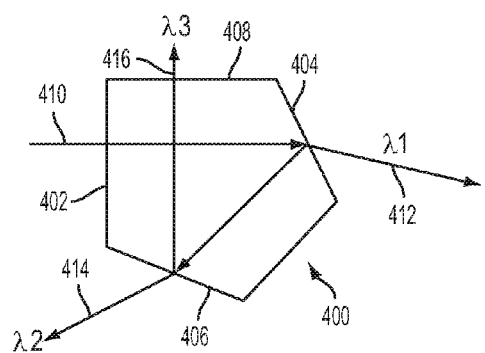
FIG. 4 illustrates another example beam splitting apparatus configured as a monolithic optical device, according to aspects of the present disclosure.

FIG. 4 illustrates an example beam splitting apparatus 400. The beam splitting apparatus 400 is a prism with five faces. An incoming beam 410 including any combination of wavelengths λ1, λ2, or λ3 enters the beam splitting apparatus 400 through a first window 402 disposed along a first face. The incoming beam 410 travels along an internal light path shared by all three wavelengths λ1, λ2, λ3. As the incoming beam 410 reaches successive faces of the beam splitting apparatus 400, dichroic surfaces separate the different wavelengths and each wavelength λ1, λ2, λ3 exits the beam splitting apparatus 400 in a different respective direction.

In particular, a second window 404 is disposed on a second face and includes a dichroic coating or film that reflects photons having the wavelengths λ2 and λ3 but allows photons having the wavelength λ1 to pass through the second window 404 as a λ1 beam 412. For instance, if the λ1, λ2, and λ3 wavelengths are 1565 nm, 1550 nm, and 850 nm, respectively, the second window 404 may include a 1558 nm LPDC. The photons having the wavelengths λ2 and λ3 are then reflected in the beam splitting apparatus 400 toward a third face including a third window 406.

The third window 406 includes a dichroic coating or film that reflects photons having the wavelength λ3 and allows photons having the wavelength λ2 to pass through the third window 406 as a λ2 beam 414. For instance, if the wavelengths λ2 and λ3 are 1550 nm and 850 nm, respectively, the third window 406 may include a 1000 nm LPDC. The photons having the wavelength λ3 are then reflected in the beam splitting apparatus 400 toward a fourth face. The fourth face includes a fourth window 408, through which photons having the wavelength λ3 exit the beam splitting apparatus 400 as a λ3 beam 416.

The beam splitting apparatus 400 may be constructed from a single unitary prism. In contrast to the beam splitting apparatus 300, the dichroic surfaces are not internal surfaces and are formed along exterior faces of the beam splitting apparatus 400. In addition, the beams 412, 414, 416 are not rectilinear with respect to the incoming light 410.

Figure 5:
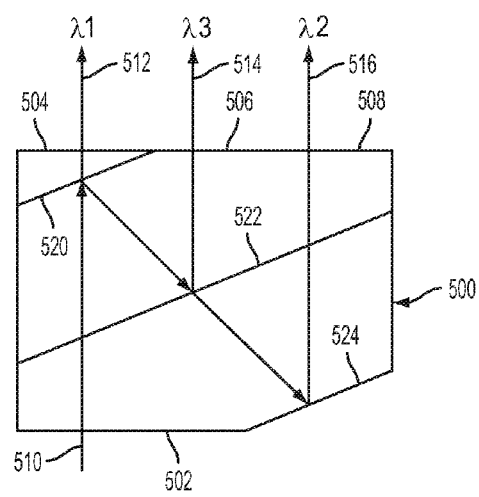
FIG. 5 illustrates yet another example beam splitting apparatus configured as a monolithic optical device, according to aspects of the present disclosure.

FIG. 5 illustrates another beam splitting apparatus 500. Like the beam splitting apparatus 300, the beam splitting apparatus 500 can be assembled from a plurality of prisms joined along respective mating surfaces to form a single monolithic optical device. An incoming beam including any combination of wavelengths λ1, λ2, or λ3 enters the beam splitting apparatus 500 through a first window 502 disposed along a first face on the exterior of the beam splitting apparatus 500. The beam splitting apparatus 500 includes optical features, such as dichroic and reflective surfaces, that define optical paths for light that enters the beam splitting apparatus 500. The optical features allow photons in the light to be directed along different optical paths based on their wavelengths. The optical features in the beam splitting apparatus 500 are provided by coatings, films, and/or surface treatments applied to any of the faces of the prisms that are joined together.

When the coatings, films, and/or surface treatments are applied to the mating surfaces of a pair of prisms, the optical features are internal to the assembled monolithic optical device. In particular, a first dichroic surface 520 is formed by applying a dichroic coating or film to one or both mating surfaces of two prisms. As such, the first dichroic surface 520 is disposed within the beam splitting apparatus 500. The prisms are configured so that the incoming beam 510 meets the dichroic surface 520 at an incidence angle of approximately 22.5 degrees. The first dichroic surface 520 reflects photons having the wavelengths λ2 and λ3 but allows photons having the wavelength λ1 to exit the beam splitting apparatus 500 through the second window 504 as a λ1 beam 512.

A second dichroic surface 522 is also formed by applying a dichroic coating or film to one or both mating surfaces between another pair of prisms. As shown in FIG. 5, the second dichroic 522 surface is disposed along a second plane that parallel to a first plane of the first dichroic surface 520. The reflected photons having wavelengths λ2 and λ3 meet the second dichroic surface 522 at the incidence angle of approximately 22.5 degrees. The second dichroic surface 522 reflects photons having the wavelength λ3 and allows photons having the wavelength λ2 to pass through the second dichroic surface 522. A reflective surface 524 is disposed along a third plane parallel to the first and second planes of the first and second dichroic surfaces 520, 522, respectively. The photons having the wavelength λ2 meet the reflective surface 524 at the incidence angle or approximately 22.5 degrees. The reflective surface 524 is formed on a face of a prism. The photons having the wavelength λ2 exits the beam splitting apparatus 500 through a fourth window 508 as a λ2 beam 516.

The reflected photons having the wavelength λ3 exits the beam splitting apparatus 500 through the third window 506 as a λ3 beam 514. As shown in FIG. 5, the λ1 beam 512, the λ2 beam 516, and the λ3 beam 514 are parallel to each other and rectilinear with respect to the incoming beam 510.

For instance, if the λ1, λ2, and λ3 wavelengths are 1565 nm, 1550 nm, and 850 nm, respectively, the first dichroic surface 520 may include a 1558 nm long-pass dichroic coating and the second dichroic surface 522 may include a 1000 nm long-pass dichroic coating. Of course, suitable anti-reflective coatings may also be applied to one or more faces to help mitigate internal reflections at each optical boundary.

While the example optical terminals and wavelength division devices are described generally in terms of optical signals at wavelengths λ1 and λ2, it is understood that the two wavelengths may have a range of different values. In some cases, wavelengths that are not readily absorbed within the atmosphere may be selected. For example, λ1 may be about 1565 nanometers, and λ2 may be about 1550 nanometers. However, many other wavelengths in the ultraviolet, visible, and near infrared spectrum may also be selected. In addition, for given values of λ1 and λ2, various optical elements may be modified accordingly. For instance, filters, emitters, detectors, and dichroic surfaces may be selected to achieve the wavelength specific behaviors described herein (including selection of lasing media, photodiodes, coatings, etc.).

In addition, while not specifically illustrated in the diagrams of, each of the example beam splitting apparatuses 300, 400, 500 can be mounted with an optical terminal with respect to a beam steering mirror and transmission/reception optics via a frame, housing, or other structural feature that the various optical components are mounted to. The frame structure can maintain the relative spacing, orientation, and/or positions of each the optical components (e.g., the lenses, dichroic elements, reflectors, the emission locations, the detection locations, etc.) such that the wavelength-specific paths traversed through the wavelength division device remain in alignment with such other features of the communication terminal.

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. An optical apparatus, comprising:
a plurality of prisms assembled together to form a single body, each prism having a plurality of faces, at least one of the faces of each prism being a mating face, each mating face being coupled to a corresponding mating face of another of the prisms, a first pair of the coupled mating faces defining a first interface, a second pair of the coupled mating faces defining a second interface, the first interface and the second interface being positioned within the body, the body configured to transmit:
(i) first photons having a first wavelength along a first path into and out of the body, and (ii) second photons having a second wavelength along a second path into and out of the body,
wherein the first interface includes a first optical feature and a third optical feature, and the second interface includes a second optical feature,
the first optical feature is configured to transmit the first photons and the second photons through the first interface,
the second optical feature is configured to transmit the first photons through the second interface and to reflect the second photons,
the third optical feature is configured to reflect the second photons,
the first photons, when traveling along the first path, are transmitted through the first interface and the second interface, and
the second photons, when traveling along the second path, are transmitted through the first interface via the first optical feature and are reflected between the second interface and the first interface via the second optical feature and the third optical feature.

2. The optical apparatus of claim 1, wherein the first optical feature and the second optical feature include a dichroic material.

3. The optical apparatus of claim 1, wherein the first wavelength is greater than the second wavelength.

4. The optical apparatus of claim 1, wherein the first optical feature and the first/second photons define a first incidence angle,
the second optical feature and the first/second photons define a second incidence angle,
the third optical feature and the second photons define a third incidence angle, and
the first, second, and third incidence angles are equal to approximately 22.5 degrees.

5. The optical apparatus of claim 1, wherein the body is further configured to transmit third photons having a third wavelength along a third path in and out of the body,
one other face of the prisms includes a fourth optical feature,
the first optical feature is further configured to reflect the third photons,
the fourth optical feature is configured to reflect the third photons, and
the third photons, when traveling along the third path, are reflected between the first interface and the one other face via the first optical feature and the fourth optical feature.

6. The optical apparatus of claim 5, wherein the first wavelength is greater than the second wavelength, and the second wavelength is greater than the third wavelength.

7. The optical apparatus of claim 5, wherein the first optical feature and the first/second photons define a first incidence angle,
the second optical feature and the first/second photons define a second incidence angle,
the third optical feature and the second photons define a third incidence angle,
the fourth optical feature and the third photons define a fourth incidence angle, and
the first, second, and third incidence angles are equal to approximately 22.5 degrees and the fourth incidence angle is approximately 45 degrees.

8. The optical apparatus of claim 5, wherein the first photons, the second photons, and the third photons are reflected an even number of times when traveling through the body.

9. The optical apparatus of claim 1, wherein the first path is a straight line and the second path into or out of the body is parallel to the straight line.

10. The optical apparatus of claim 1, wherein the prisms are solids formed homogeneously from glass.

11. A method for making an optical apparatus, comprising:
providing a plurality of prisms, each prism having a plurality of faces, at least one of the faces of each prism being a mating face;
coupling each mating face to a corresponding mating face of another of the prisms, a first pair of the coupled mating faces defining a first interface, a second pair of the coupled mating faces defining a second interface, the first interface and the second interface being positioned within a single body, the body configured to transmit: (i) first photons having a first wavelength along a first path into and out of the body, and (ii) second photons having a second wavelength along a second path into and out of the body, providing a first optical feature and a third optical feature along the first interface; and providing a second optical feature along the second interface;

wherein the first optical feature is configured to transmit the first photons and the second photons through the first interface, the second optical feature is configured to transmit the first photons through the second interface and to reflect the second photons, the third optical feature is configured to reflect the second photons, the first photons, when traveling along the first path, are transmitted through the first interface and the second interface, and the second photons, when traveling along the second path, are transmitted through the first interface via the first optical feature and are reflected between the second interface and the first interface via the second optical feature and the third optical feature.

12. The method of claim 11, wherein providing the first optical feature along the first interface includes applying dichroic material to at least one of the first pair of mating faces, and providing the second optical feature along the second interface includes applying dichroic material to at least one of the second pair of mating faces.

13. The method of claim 11, wherein providing the third optical feature along the first interface includes applying a reflective material to at least one of the first pair of mating faces.

14. The method of claim 11, further comprising providing a fourth optical feature along one other face of the prisms,
wherein the body is further configured to transmit third photons having a third wavelength along a third path in and out of the body,
the first optical feature is further configured to reflect the third photons,
the fourth optical feature is configured to reflect the third photons, and
the third photons, when traveling along the third path, are reflected between the first interface and the one other face via the first optical feature and the fourth optical feature.

15. The method of claim 14, wherein providing the fourth optical feature along one other face of the prisms includes applying a reflective material to the one other face.

16. A system comprising:
a beam-steering mechanism;
a first emitter and a second emitter operable to emit data-modulated light at a first wavelength and at a second wavelength, respectively;
a first detector and a second detector operable to generate indications of incident light intensity at the first wavelength and at the second wavelength, respectively; and
an optical apparatus configured to: (i) direct first photons having the first wavelength between the first emitter and the beam-steering mechanism or between the beam-steering mechanism and the first detector, and (ii) direct second photons having the second wavelength between the second emitter and the beam-steering mechanism or between the beam-steering mechanism and the second detector, wherein the optical apparatus comprises:

a plurality of prisms assembled together to form a single body, each prism having a plurality of faces, at least one of the faces of each prism being a mating face, each mating face being coupled to a corresponding mating face of another of the prisms, a first pair of the coupled mating faces defining a first interface, a second pair of the coupled mating faces defining a second interface, the first interface and the second interface being positioned within the body, the body configured to transmit: (i) the first photons having the first wavelength along a first path into and out of the body, and (ii) the second photons having the second wavelength along a second path into and out of the body, wherein the first interface includes a first optical feature and a third optical feature, and the second interface includes a second optical feature, the first optical feature is configured to transmit the first photons and the second photons through the first interface, the second optical feature is configured to transmit the first photons through the second interface and to reflect the second photons, the third optical feature is configured to reflect the second photons, the first photons, when traveling along the first path, are transmitted through the first interface and the second interface, and the second photons, when traveling along the second path, are transmitted through the first interface via the first optical feature and are reflected between the second interface and the first interface via the second optical feature and the third optical feature.

17. The system of claim 16, wherein the first optical feature and the second optical feature include a dichroic material.

18. The system of claim 16, further comprising a third detector operable to generate indications of incident light intensity at a third wavelength,
wherein the body is further configured to transmit third photons having the third wavelength along a third path in and out of the single body,
one other face of the prisms includes a fourth optical feature,
the first optical feature is further configured to reflect the third photons,
the fourth optical feature is configured to reflect the third photons, and
the third photons, when traveling along the third path, are reflected between the first interface and the one other face via the first optical feature and the fourth optical feature, and
the beam-steering mechanism is adjustable according to the indications from the third detector.

19. The system of claim 18, wherein the first optical feature and the first/second photons define a first incidence angle,
the second optical feature and the first/second photons define a second incidence angle,
the third optical feature and the second photons define a third incidence angle,
the fourth optical feature and the third photons define a fourth incidence angle, and
the first, second, and third incidence angles are equal to approximately 22.5 degrees and the fourth incidence angle is approximately 45 degrees.

20. The system of claim 16, wherein the first path is a straight line and the second path into or out of the body is parallel to the straight line.

* * * * *